No. 668,243. Patented Feb. 19, 1901.
A. WEED.
BOTTOM BRACKET FOR BICYCLES.
(Application filed Apr. 20, 1900.)
(No Model.)
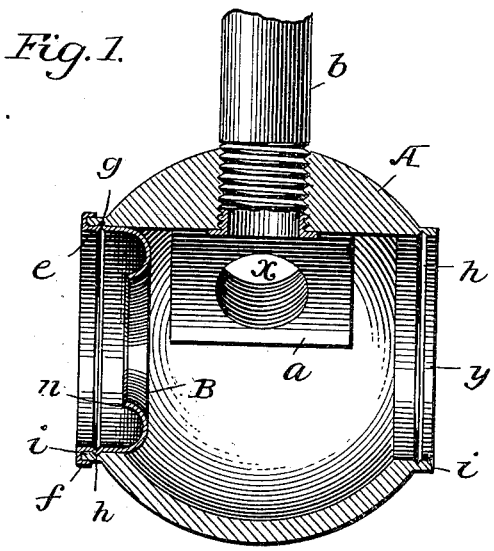
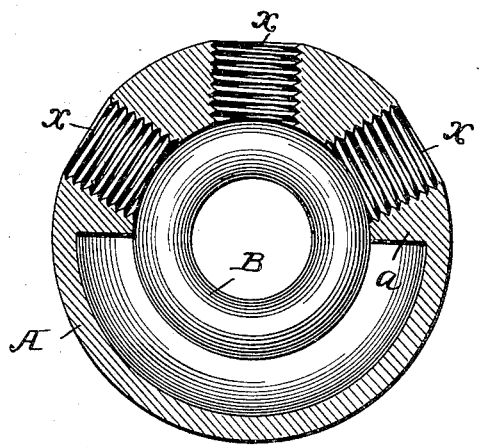
Witnesses
J. G. Hinkel
J. J. McCarthy
Inventor
Alfred Weed
By Foster Freeman
Attorneys

UNITED STATES PATENT OFFICE.

ALFRED WEED, OF ANDERSON, INDIANA.

BOTTOM BRACKET FOR BICYCLES.

SPECIFICATION forming part of Letters Patent No. 668,243, dated February 19, 1901.

Application filed April 20, 1900. Serial No. 13,640. (No model.)

*To all whom it may concern:*

Be it known that I, ALFRED WEED, a citizen of the United States, residing at Anderson, in the county of Madison and State of Indiana, have invented certain new and useful Improvements in Bottom Brackets for Bicycles, of which the following is a specification.

My invention relates to the junction-pieces of velocipedes, either bicycles or tricycles; and my invention consists of a junction-piece composed of a shell spherical or cylindrical in shape, thickened at a portion of its periphery, so as to secure radial sockets of a depth permitting of the rigid attachment of the tubular members of the frame of the velocipede, and with side openings and rings secured therein and constituting bearings for the balls supporting the pedal-shaft, as fully set forth hereinafter and as illustrated in the accompanying drawings, in which—

Figure 1 is a longitudinal section of my improved junction-piece; Fig. 2, a cross-section.

The improved junction-piece A is externally cylindrical or spherical, preferably the latter, and is made as thin as possible consistent with strength, but is provided with an interior projection $a$, extending circularly so far as may be necessary to include that portion of the article in which are made radial openings $x$ for the reception of the tubular members of the frame. These openings $x$ are threaded, as shown, and, being in the thickened portion of the article, present extended bearings, so that a secure attachment may be obtained by screwing the tubes into the threaded openings or sockets. If desired, the end of a tube $b$ may be spread or distended after the tube is inserted, as shown in Fig. 1. By this means, without unduly increasing the weight of the junction-piece, I am enabled to secure a firm attachment and rigid connection with the tubular members of the frame.

The support for the pedal-shaft consists of rings B, which are fitted to circular openings $y$ in the opposite sides of the junction-piece. As shown, each ring has a cylindrical portion $e$, adapted to fit nicely the edge of the opening $y$, and is provided with a flange $f$, which is bent over an external rib $i$ upon the junction-piece and surrounds the opening $y$, so that the flange $f$ may clamp the same in such manner as to hold the ring B firmly in place. If desired, an annular groove $h$ may be formed in the face of the opening $y$, and the portion $e$ of the ring may be pressed outward, forming an annular rib $g$, extending into the groove $h$ and further tending to obtain a secure connection. A flange $n$ of the ring B is suitably shaped to constitute, with the part $e$, a suitable bearing for the balls, against which may bear the collar upon the crank-shaft, as in any ordinary construction. It will be understood, however, that the form and character of the ring B will vary somewhat according to circumstances and that it may be secured in the junction-piece in different ways.

Without limiting myself to the precise construction and arrangement of parts shown, I claim as my invention—

1. A junction-piece for receiving the pedal-shaft of a velocipede, consisting of a hollow shell having a continuous interior projection extending circularly for part of the circumference of the shell and provided with radial sockets, and bearing-rings in the end openings of the shell, substantially as described.

2. A junction-piece for receiving the pedal-shaft of a velocipede, consisting of a continuous open-ended hollow shell free from external projections, with radial sockets and with the wall thickened at the point where the sockets are situated, substantially as described.

3. A junction-piece for velocipedes, consisting of an open-ended hollow shell provided with radial sockets and having its wall thickened at the point where the sockets are situated, annular ribs around the end openings, grooves $h$ within the latter, bearing-rings inserted into the openings and provided with flanges fitting over said ribs, and ribs $g$ on the rings extending into said grooves, substantially as described.

In testimony whereof I have signed my name to this specification in the presence of two subscribing witnesses.

ALFRED WEED.

Witnesses:
V. BIGELOW,
AUSTIN TYLER.